United States Patent [19]
Ahn

[11] Patent Number: 5,666,343
[45] Date of Patent: Sep. 9, 1997

[54] DISK PLAYER HAVING A SHUTTER OPENING STRUCTURE IN WHICH A SHUTTER OF THE DISK CARTRIDGE IS OPENED WITHOUT A CARTRIDGE HOLDER

[75] Inventor: Seung-joon Ahn, Seoul, Rep. of Korea

[73] Assignee: Samsung Electronics Co., Ltd., Kyungki-do, Rep. of Korea

[21] Appl. No.: 581,226

[22] Filed: Dec. 29, 1995

[51] Int. Cl.⁶ .................................................. G11B 17/035
[52] U.S. Cl. ............................. 369/77.2; 360/99.02
[58] Field of Search ...................... 360/99.02, 99.03, 360/99.06, 99.07, 96.5, 96.6; 369/77.2, 75.2, 75.1

[56] References Cited

U.S. PATENT DOCUMENTS

| | | | |
|---|---|---|---|
| 4,755,895 | 7/1988 | Saito | 360/99.02 |
| 5,124,975 | 6/1992 | Naoki et al. | 360/99.06 |
| 5,216,558 | 6/1993 | Griffith et al. | 360/99.02 |
| 5,267,706 | 12/1993 | Vollman | 360/99.06 |
| 5,355,357 | 10/1994 | Yamamori et al. | 369/77.2 |
| 5,450,377 | 9/1995 | Eom | 369/77.2 |

FOREIGN PATENT DOCUMENTS

| | | | |
|---|---|---|---|
| 0195535 | 9/1986 | European Pat. Off. | 360/99.06 |
| 59-104755 | 6/1984 | Japan | 360/99.06 |
| 59-218680 | 12/1984 | Japan | 360/99.06 |
| 61-11964 | 1/1986 | Japan | 360/99.06 |
| 61-206965 | 9/1986 | Japan | 360/99.06 |

*Primary Examiner*—Stuart S. Levy
*Assistant Examiner*—Brian E. Miller
*Attorney, Agent, or Firm*—Sughrue, Mion, Zinn, Macpeak & Seas

[57] ABSTRACT

A disk player having a simple shutter opening structure in which a shutter of a disk cartridge can be opened without a cartridge holder. The disk player includes a deck, a cover attached to the deck to be opened and closed and a shutter opening/closing device for opening and closing the shutter of the disk cartridge loaded on the deck. Therefore, the manufacturing costs and the problems due to the interference between constituent components are reduced, and the disk player is further miniaturized.

4 Claims, 8 Drawing Sheets

DISK PLAYER HAVING A SHUTTER OPENING STRUCTURE IN WHICH A SHUTTER OF THE DISK CARTRIDGE IS OPENED WITHOUT A CARTRIDGE HOLDER

BACKGROUND OF THE INVENTION

The present invention relates to a disk player using a disk cartridge in which a disk is rotatably received, and more particularly, to a disk player having a shutter opening structure in which a shutter of the disk cartridge is opened without a cartridge holder.

As is well known, a disk is used in the form of a disk cartridge in which the disk is enclosed in a cartridge cell to be loaded in a disk player.

Recently, since a disk cartridge called a "minidisk" (64 mm diameter) was placed on the market by Sony, the development of a disk player therefor has progressed actively. There are two types of minidisks currently available a recordable type shown in FIGS. 1A and 1B and a reproduction-only type shown in FIGS. 2A and 2B.

Figure 1A:
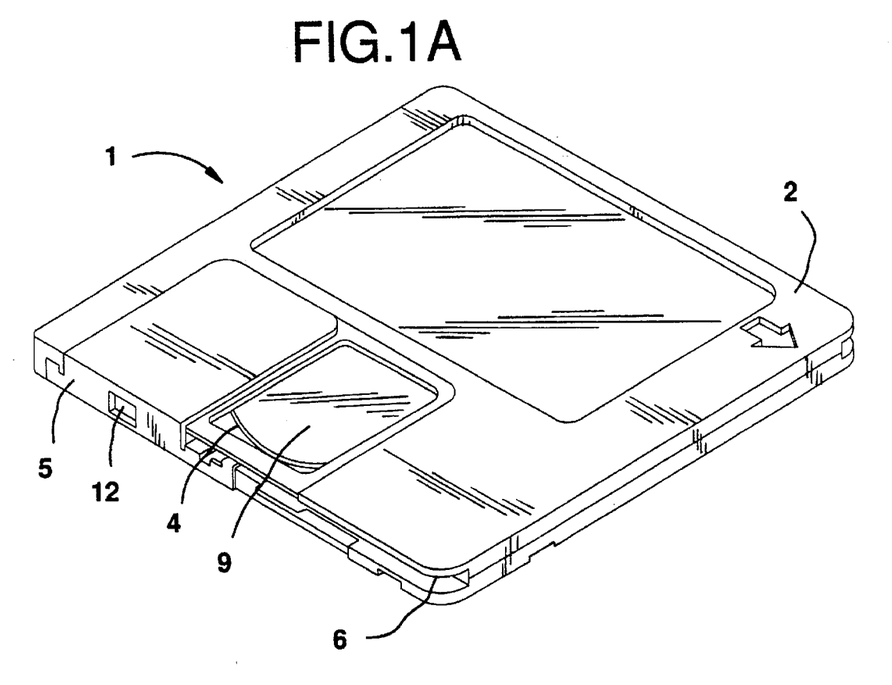
FIGS. 1A and 1B are perspective views of a recordable disk cartridge from the top and bottom, respectively.
Figure 1B:
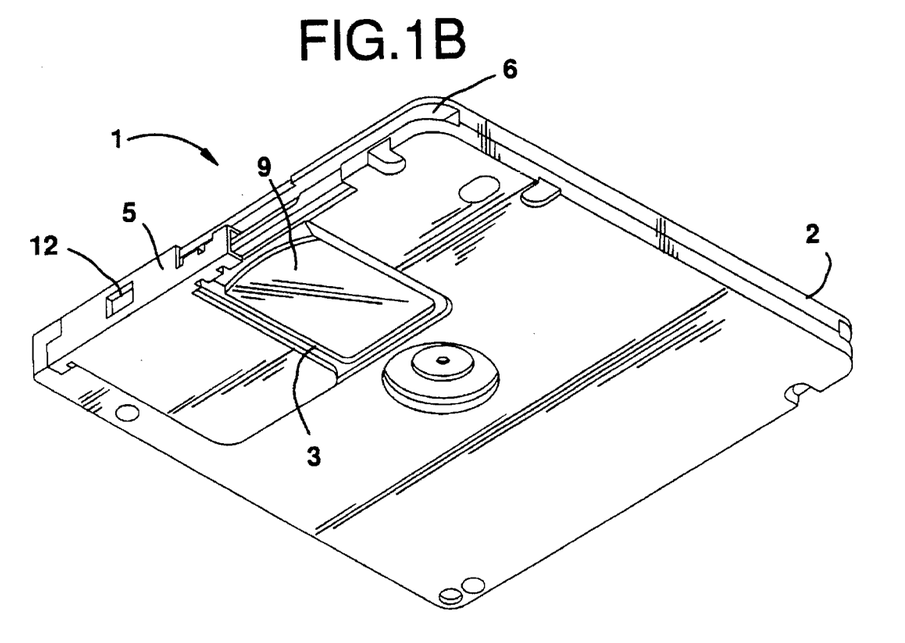

Referring to FIGS. 1A and 1B, a recordable minidisk 1 has a cartridge cell 2 having two openings 3 and on both sides thereof and a shutter 5 which moves along a sliding groove 6 so as to simultaneously open and close openings 3 and 4. Both sides of a disk 9 in cartridge cell 2 are exposed through openings 3 and 4.

Figure 2A:
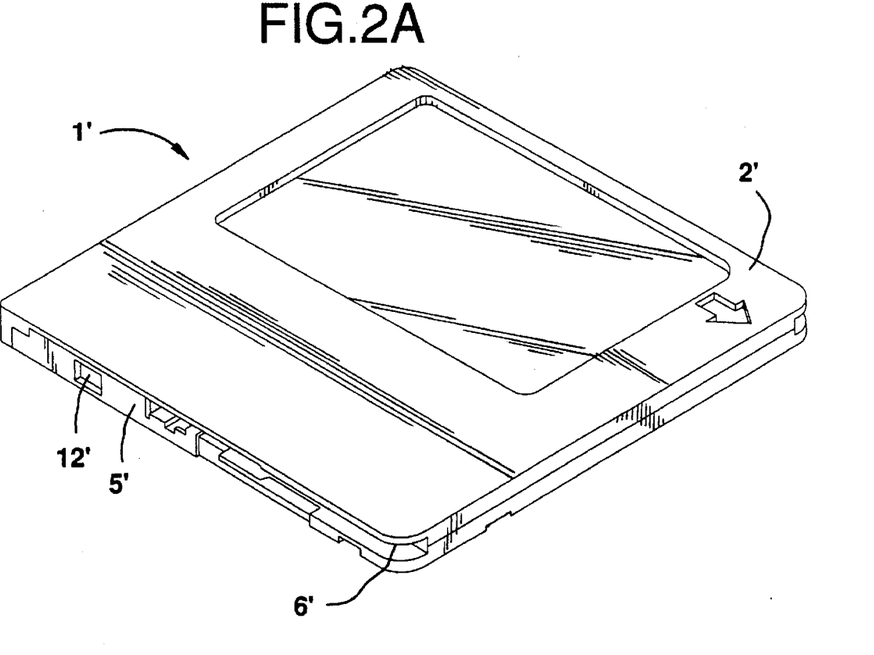
FIGS. 2A and 2B are perspective views of a reproduction-only disk cartridge from the top and bottom, respectively.
Figure 2B:
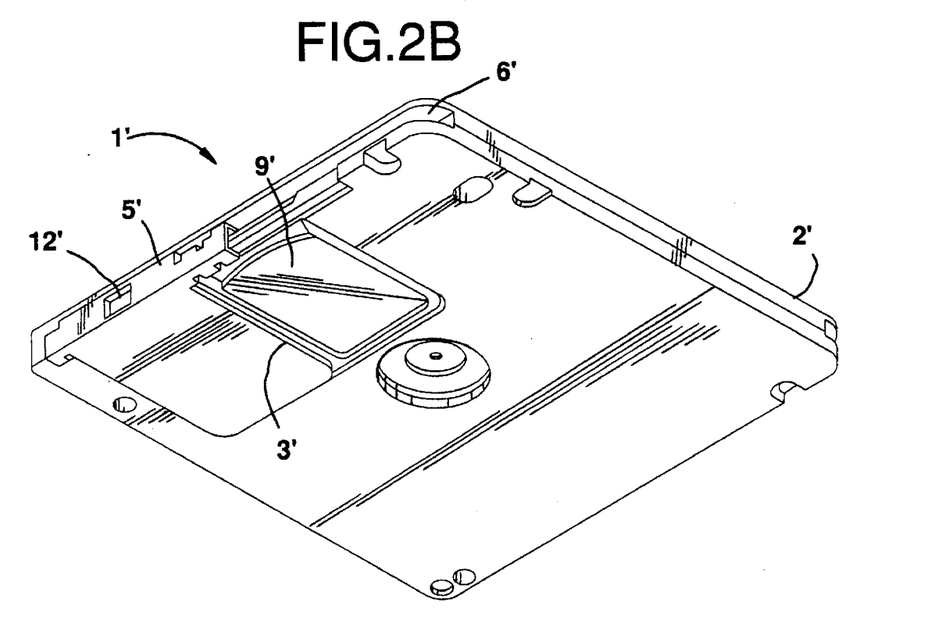

In FIGS. 2A and 2B, reproduction-only minidisk 1' has a cartridge cell 2' having an opening 3' only on one side thereof and a shutter 5' which moves along a sliding groove 6' so as to open and close opening 3'. Thus, only the one side of disk 9' is exposed through opening 3'.

Also, in recordable and reproduction-only minidisk 1 and 1', rectangular grooves 12 and 12' are formed in shutters 5 and 5', respectively, and locking hooks (not shown) for locking shutters 5 and 5' are formed inside of sliding grooves 6 and 6'.

Figure 3:
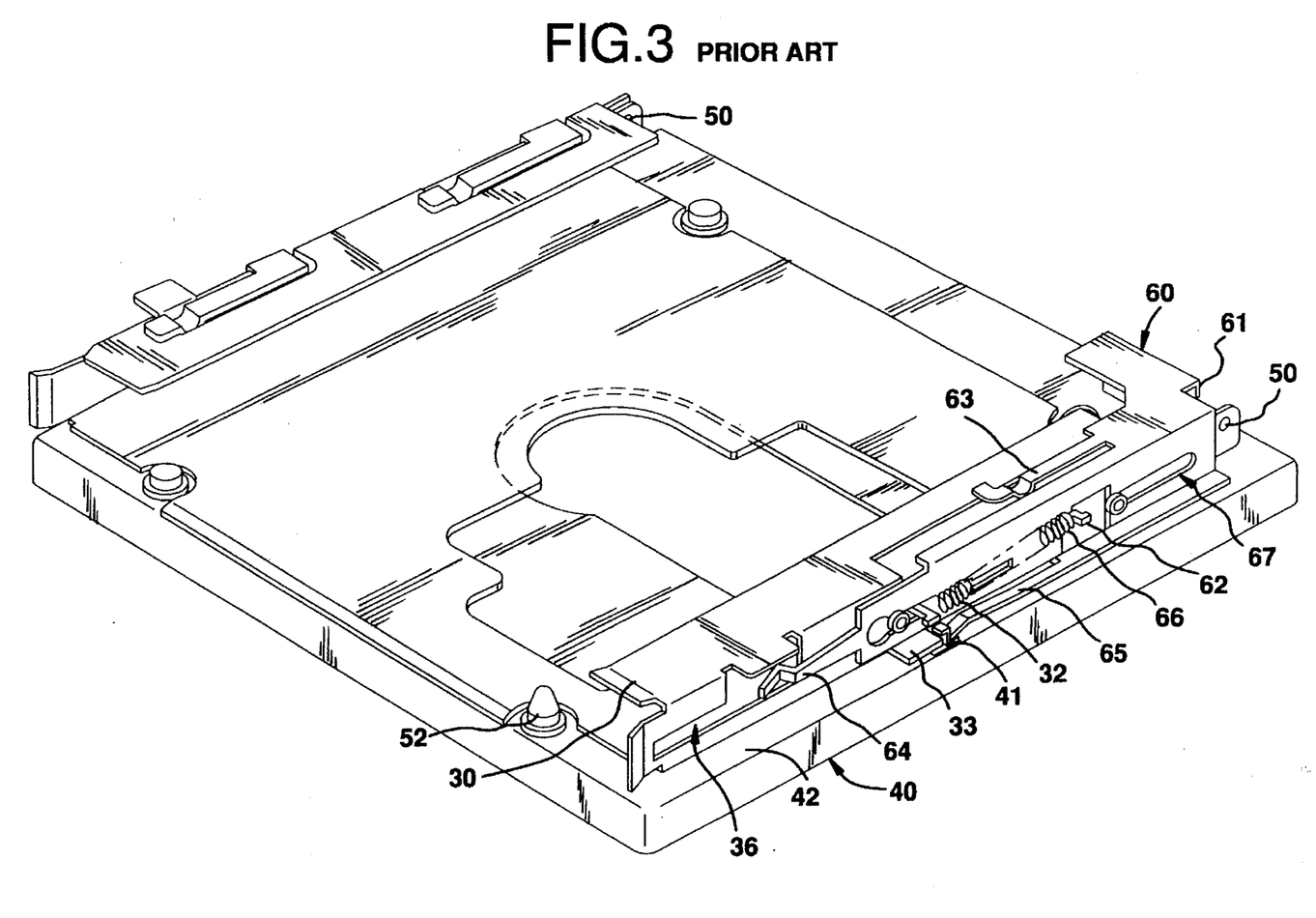
FIG. 3 is a perspective view of a shutter opening structure of a conventional disk player.

FIG. 3 is a perspective view of a shutter opening structure of a conventional disk player which utilizes disk cartridges 1 and 1'. As shown in FIG. 3, in the rear portion of an upper surface 42 of a deck 40 on which an optical pickup (not shown) for reproducing information recorded on disk 9 or 9' (see FIGS. 1A and 2B) within disk cartridge 1 or 1' (see FIGS. 1 and 2), a cartridge holder 30 into which disk cartridge 1 or 1' is inserted from the outside is connected by a hinge 50, and an ejecting portion 60 for ejecting disk cartridge 1 or 1' inserted into cartridge holder 30 is installed.

Ejecting portion 60 comprises a contact portion 61 which contacts disk cartridge 1 or 1' as disk cartridge 1 or 1' is inserted into cartridge holder 30, a press spring 63 for pressing the inserted disk cartridge 1 or 1', a shutter opening/closing portion 64 for opening/closing shutter 5 or 5' (see FIGS. 1A and 2B) when disk cartridge 1 or 1' is inserted or ejected, a spring 66 for elastically biasing ejecting portion 60 toward the ejecting direction, that is, the forward direction, a spring fixing portion 62 to which one end of spring 66 is fixed, and a locking spring 65 which is elastically biased downward so as to prevent the inserted disk cartridge 1 or 1' from being ejected. Also, a slit 67 for guiding ejecting portion 60 as disk cartridge 1 or 1' is inserted or ejected is formed at the sidewall of ejecting portion 60.

In cartridge holder 30, a spring fixing portion 32 to which the other end of spring 66 from ejecting portion 60 is fixed, a locking protrusion 33 to which locking spring 65 of ejecting portion 60 is locked, a slit 36 for guiding shutter opening/closing portion 64 to open/close shutter 5 or 5' of disk cartridge 1 or 1' being inserted/ejected, and a locking releasing portion (not shown) for releasing a locking state of shutter 5 or 5', are provided.

Also, on upper surface 42 of deck 40, there are installed a locking releasing protrusion 41 for releasing locking spring 65 locked by locking protrusion 33 of cartridge holder 30, and a stabilizing pin 52 for disk cartridge 1 or 1' to be loaded without being shaken.

However, as described above, the disk cartridge using the cartridge holder requires many components for loading the disk cartridge on the deck and opening/closing the shutter of the disk cartridge, thereby causing a cost increase and problems due to interference between the components.

SUMMARY OF THE INVENTION

It is an object of the present invention to provide a disk player having a simple shutter opening structure in which a shutter of a disk cartridge can be opened without a cartridge holder.

To achieve the above object, there is provided a disk player having a deck, a cover attached to the deck to be opened/closed and a shutter opening/closing means for opening/closing a shutter of a disk cartridge loaded on the deck, wherein the shutter opening/closing means comprises: a shutter opening slide having a shutter opening/closing portion for opening/closing the shutter and a locking releasing portion for releasing a locking state of the shutter; and a link placed between the shutter opening slide and the cover, whereby the shutter opening slide moves by the link as the cover is opened/closed, so that the shutter opening/closing portion opens/closes the shutter.

Also, a guide slot is formed at one side of the shutter opening slide, a deck slide for guiding the shutter opening slide is extended from one side of the deck, and a pin for guiding the shutter opening slide while being inserted into the guide slot of the shutter opening slide is provided on the deck slide.

In addition, the leading end portion of the guide slot is bent toward a side portion of the deck, thereby preventing the disk cartridge from contacting the shutter opening/closing portion as the disk cartridge is inserted to/ejected from the deck.

BRIEF DESCRIPTION OF THE DRAWINGS

The above objects and advantages of the present invention will become more apparent by describing in detail a preferred embodiment thereof with reference to the accompanying drawings, in which.

3

DETAILED DESCRIPTION OF THE PREFERRED EMBODIMENT

Figure 4:
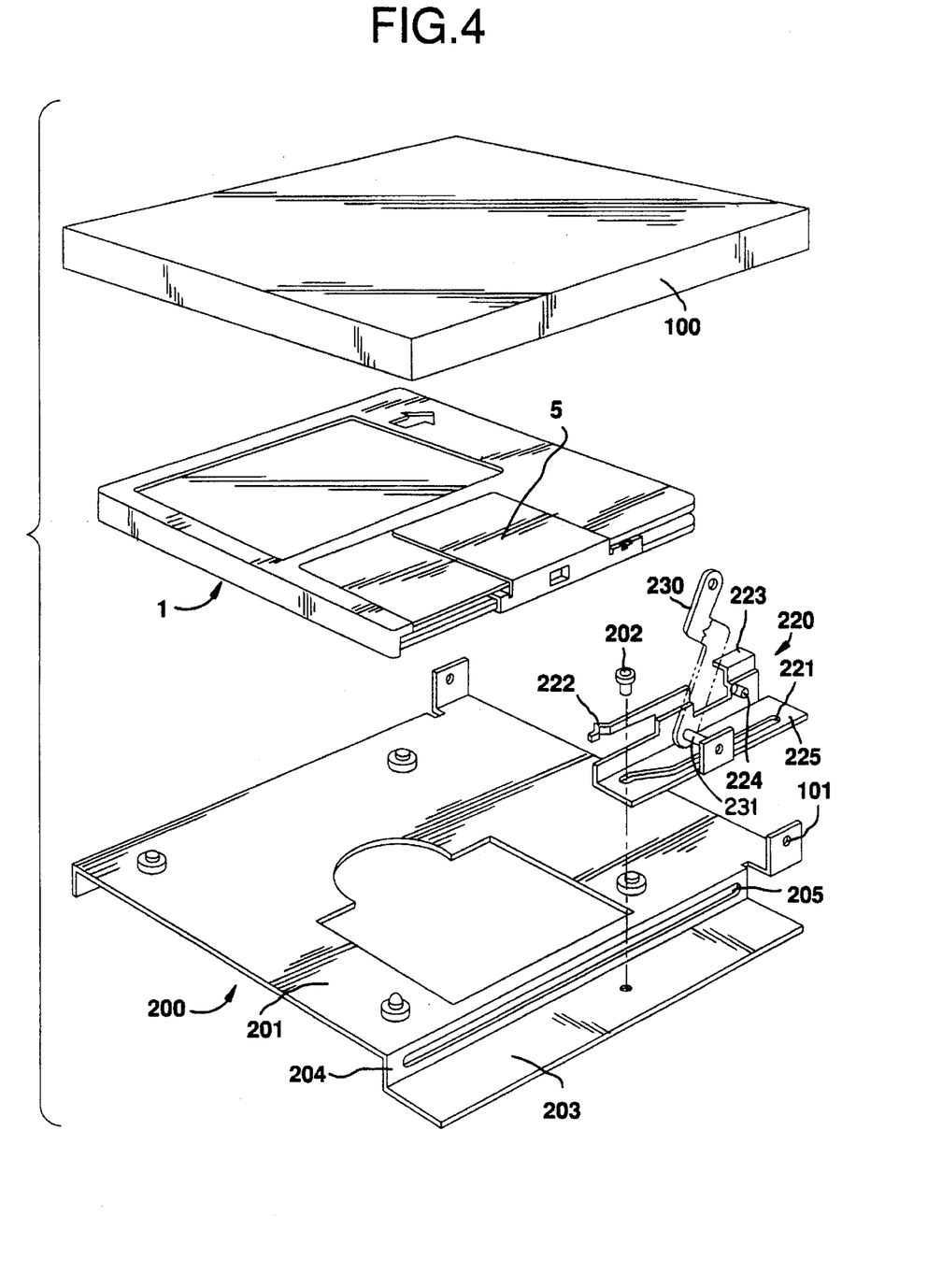
FIG. 4 is an exploded perspective view of a major portion in a disk player having a shutter opening structure according to the present invention.

In FIG. 4, which shows the major portion of a disk player having a shutter opening structure according to the present invention, reference numeral 100 represents a cover and reference numeral 200 represents a deck.

An optical pickup (not shown) is installed on deck 200 and a disk cartridge 1 is loaded on an upper surface 201 of deck 200. A deck slide 203 having a first pin 202 thereon is formed at a side of deck 200. The, deck slide 203 is attached to the upper surface 201 of the deck 200 via a deck side portion 204 formed with a first guide slot 205 along which a shutter opening slide 220 is guided.

Shutter opening slide 220 is provided with a contact portion 225 which contacts the upper surface of the deck slide 203 and has a second guide slot 221, a shutter opening/closing portion 222 for opening/closing a shutter 5 of disk cartridge 1, and a locking releasing portion 223 for releasing the locked shutter 5. Also, at the lower portion of the locking releasing portion 223, a second pin 224, which is inserted into the first guide slot 205, and a rod 231, which is connected to one end of a link 230, are provided. One side of the rod 231 is inserted into the first guide slot 205 together with the second pin 224 so that the shutter opening slide 220 is guided along the first guide slot 205.

The leading end portion of the second guide slot 221 is bent toward the deck side portion 204 so as to prevent disk cartridge 1 from contacting the shutter opening/closing portion 222 as disk cartridge 1 is loaded on the upper surface 201 of deck 200.

Cover 100 is attached to the deck 200 by a hinge 101 and the rear end portion of cover 100 is connected to the other end of the link 230. Thus, as cover 100 rotates, shutter opening slide 220 is guided along the first and second guide slots 205 and 221 by link 230.

The operations of the disk player having the above described shutter opening structure according to the present invention will be described with reference to FIGS. 5 to 7.

Figure 5:
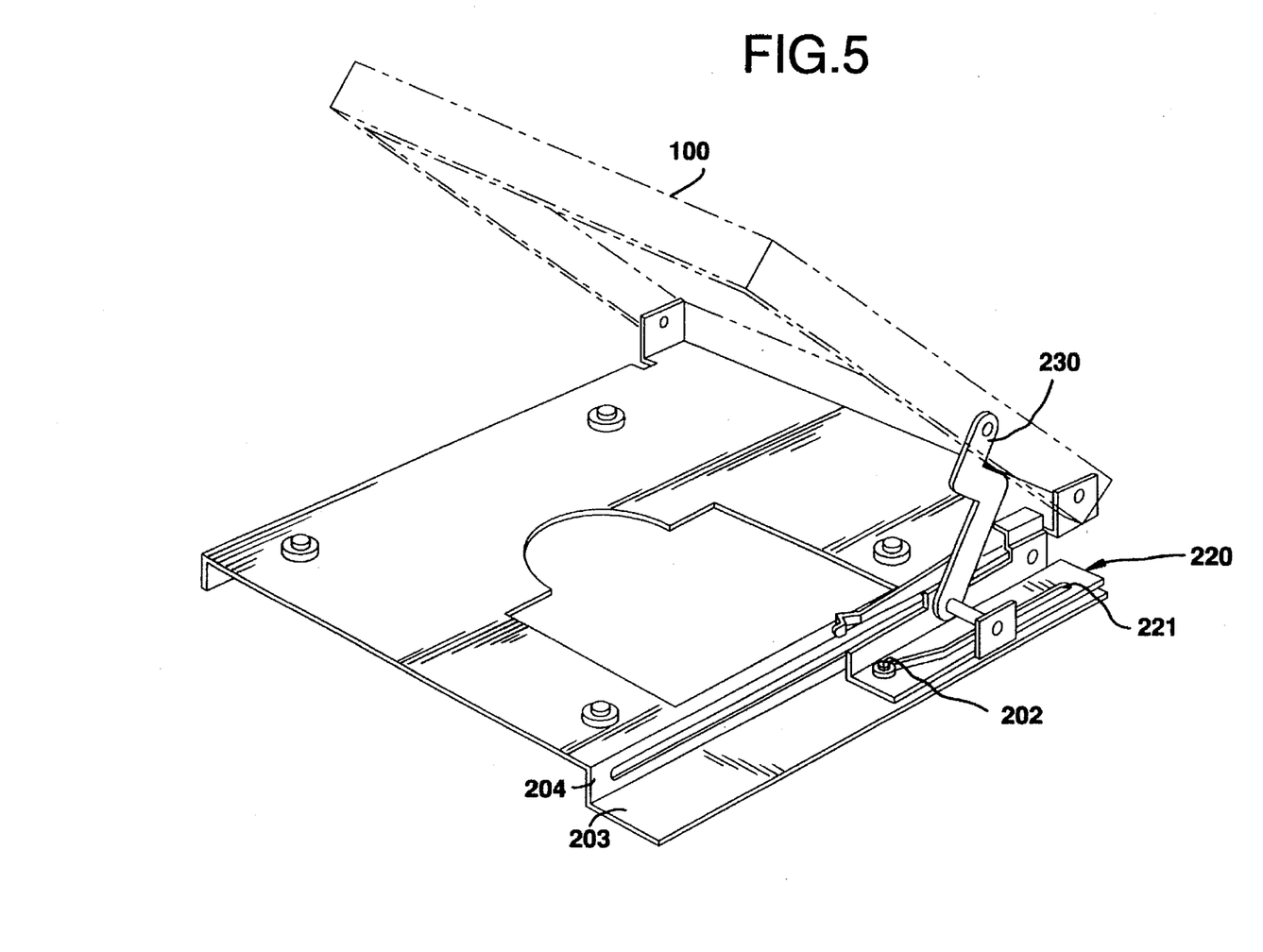
FIG. 5 is a perspective view showing the state where a cover is opened, in the disk player having the shutter opening structure according to the present invention.
Figure 6:
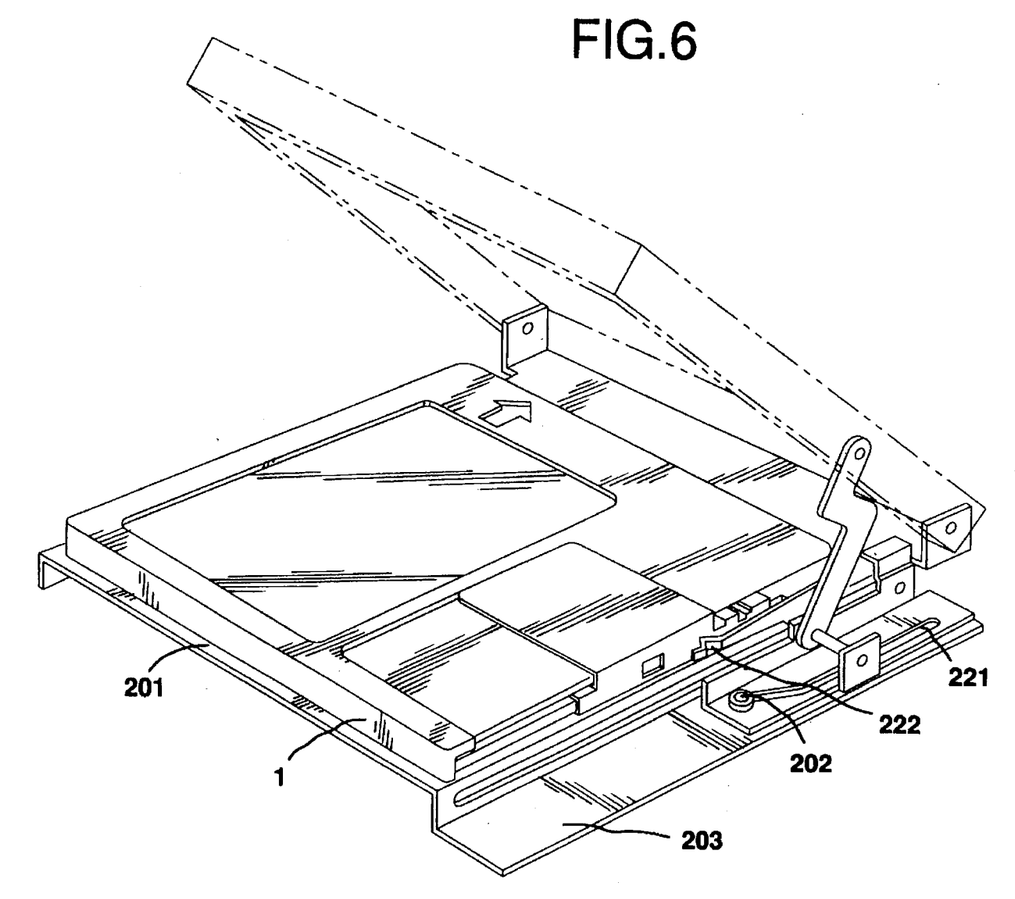
FIG. 6 is a perspective view showing the state where a disk cartridge is loaded, in the disk player having the shutter opening structure according to the present invention.

FIG. 5 is a perspective view showing the state where the cover 100 is opened, in the disk player having the shutter opening structure according to the present invention. As shown, when cover 100 is opened, the shutter opening slide 220 is located at the rear portion of the deck slide 203 by link 230. In this position, since the leading end portion of the second guide slit 221 is guided by the first pin 202 fixed on the deck slide 203, shutter opening slide 220 is separated from the deck side portion Thus, as shown in FIG. 6, when loading disk cartridge 1 on the upper surface 201 of deck 200, disk cartridge 1 can be loaded on the upper surface 201 of deck 200 without contacting the shutter opening/closing portion 222.

Figure 7:
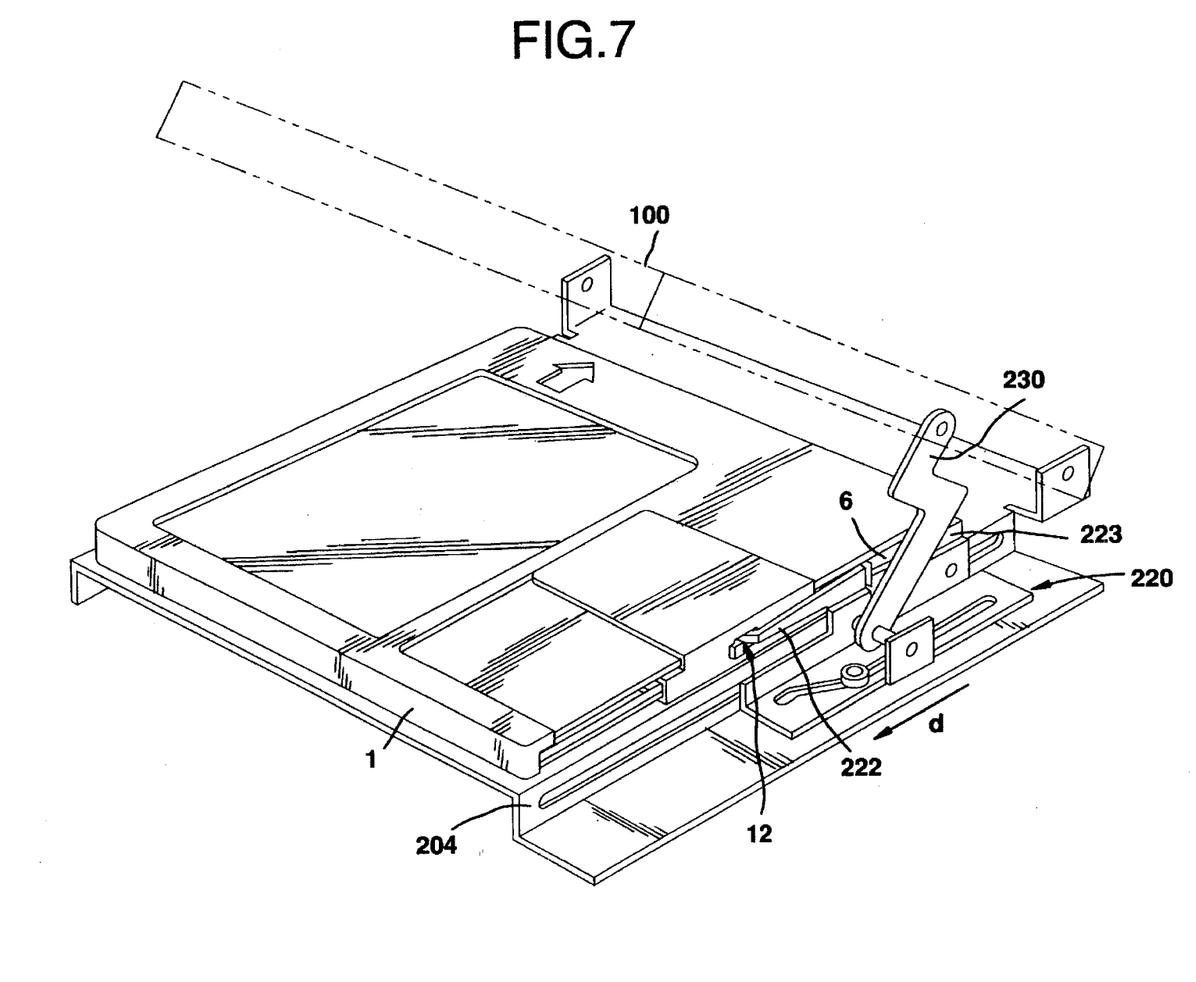
FIG. 7 is a perspective view showing the state where the cover is being closed after the disk cartridge is loaded on the disk player having the shutter opening structure according to the present invention.

FIG. 7 is a perspective view showing the state where the cover 100 is being closed after the disk cartridge is loaded on the disk player having the shutter opening structure according to the present invention. As shown, when pulling down the cover 100 by a predetermined angle, shutter opening slide 220 moves forward, that is, in a direction d, by the link 230 connected between cover 100 and the shutter opening slide 220. As shutter opening slide 220 moves in the d direction, shutter opening slide 220 contacts the deck side portion 204. The, shutter opening/closing portion 222 of shutter opening slide 220 is then inserted into a rectangular groove 12 formed at the sidewall of shutter 5 and locking releasing portion 223 is inserted into a sliding groove 6 formed at the sidewall of disk cartridge 1 to push a shutter locking hook (not shown) formed inside sliding groove 6, thereby releasing shutter 5 from the locking state.

Figure 8:
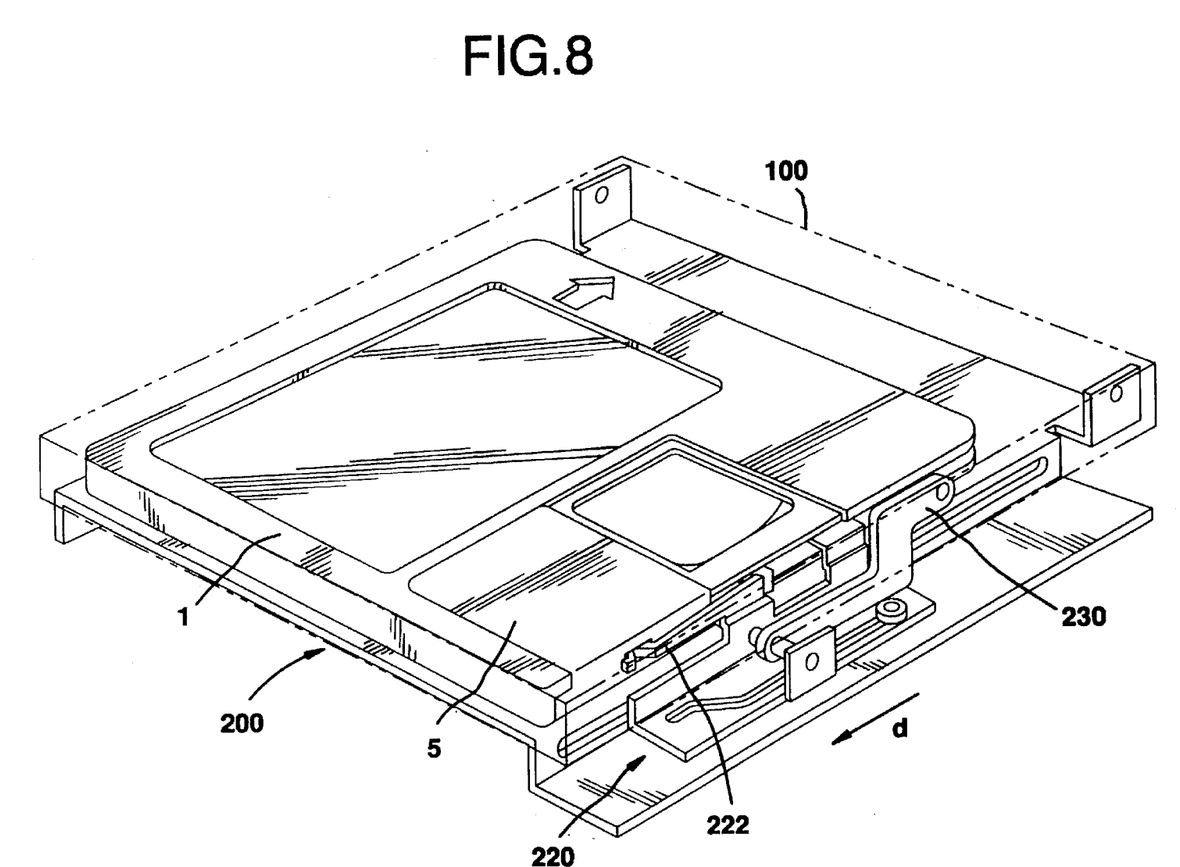
FIG. 8 is a perspective view showing the state where a shutter of the disk cartridge is opened after the disk cartridge is loaded and the cover is closed, in the disk player having the shutter opening structure according to the present invention.

FIG. 8 is a perspective view showing the state where a shutter of the disk cartridge is opened after the disk cartridge is loaded and the cover 100 is closed, in the disk player having the shutter opening structure according to the present invention. As shown, as the cover 100 is closed, shutter opening slide 220 further moves in the d direction so that shutter 5 is completely opened by shutter opening/closing portion 222. Also, a leaf spring (not shown) installed on the cover 100 pushes disk cartridge 1 to be stably loaded on the deck 200. In this state, the disk player records intended information on the disk in disk cartridge 1 or reproduces the recorded information therefrom using an optical pickup.

When the cover 100 is opened, shutter opening slide 220 moves in the rear direction, that is, the opposite direction to the d direction, and the shutter opening/closing portion 222 closes the shutter 5 as shutter opening slide 220 moves. Shutter 5 is locked by the shutter locking hook (not shown). In this state, a user may exchange disk cartridge 1 for another disk cartridge by hand. That is, as shown in FIG. 6, since the leading end portion of second guide slot 221 is caught on the first pin 202 of deck slide 203, disk cartridge 1 is prevented from contacting shutter opening/closing portion 222.

As described above, the disk player according to the present invention adopts the simple shutter opening structure in which the disk cartridge can be loaded on the deck without a cartridge holder, so that there are provided the following advantages of: reduction of the manufacturing costs and the problems due to the interference between components and further miniaturization of the disk player.

What is claimed is:

1. A disk player having a deck, a cover pivotally attached to said deck to be opened and closed and a shutter opening/closing means for opening and closing a shutter of a disk cartridge loaded on said deck, wherein said shutter opening/closing means comprises:

a shutter opening slide slidably mounted on said deck and having a shutter opening/closing portion for opening and closing said shutter, and a locking releasing portion for releasing a locking state of said shutter with respect to said disk cartridge when said shutter is closed; and a link placed between said shutter opening slide and said cover, said link having one end pivotally connected to said shutter opening slide and another end pivotally connected to said cover, whereby said shutter opening slide is slidably moved by said link as said cover is opened and closed, so that said shutter opening/closing portion opens and closes said shutter.

2. The disk player as claimed in claim 1, further comprising a guide slot formed at one side of said shutter opening slide; a deck slide, for guiding said shutter opening slide, extended from one side of said deck; and a pin, for guiding said shutter opening slide while being inserted into the guide slot of said shutter opening slide, provided on said deck slide.

3. The disk player as claimed in claim 2, wherein said guide slot has a leading end portion which is bent toward a side portion of said deck, thereby preventing said disk cartridge from contacting said shutter opening/closing portion as said disk cartridge is either inserted to or removed from the deck.

4. The disk player as claimed in claim 3, wherein said side portion of said deck includes a further guide slot, and wherein said shutter opening slide includes a further pin which is inserted into said further guide slot so as to guide said shutter opening slide.

\* \* \* \* \*